(12) United States Patent
Hoog et al.

(10) Patent No.: US 7,146,253 B2
(45) Date of Patent: Dec. 5, 2006

(54) DEVICE AND METHOD FOR INTERACTIVE PROGRAMMING OF A THERMOSTAT

(75) Inventors: Klaus D. Hoog, Durham, NC (US); Nims P. Knobloch, Jr., Metairie, LA (US)

(73) Assignee: Smartway Solutions, Inc., Durham, NC (US)

( * ) Notice: Subject to any disclaimer, the term of this patent is extended or adjusted under 35 U.S.C. 154(b) by 463 days.

(21) Appl. No.: 10/395,587

(22) Filed: Mar. 24, 2003

(65) Prior Publication Data

US 2004/0193324 A1 Sep. 30, 2004

(51) Int. Cl.
*G05B 15/00* (2006.01)

(52) U.S. Cl. .................. 700/276; 700/86; 340/539.14; 236/94; 704/275

(58) Field of Classification Search .................. 700/86, 700/276; 340/539.14, 539.27; 236/94; 704/275
See application file for complete search history.

(56) References Cited

U.S. PATENT DOCUMENTS

| 5,690,277 | A | 11/1997 | Flood |
| 6,130,624 | A | 10/2000 | Guyer |
| 6,179,213 | B1 | 1/2001 | Gibino et al. |
| 6,385,495 | B1 | 5/2002 | Bennett |
| 6,413,079 | B1 * | 7/2002 | Lyons et al. ................. 431/125 |
| 6,483,695 | B1 | 11/2002 | Hartstein |
| 6,502,758 | B1 | 1/2003 | Cottrell |
| 6,747,506 | B1 * | 6/2004 | Thiara ........................ 327/537 |
| 6,747,566 | B1 * | 6/2004 | Hou ...................... 340/825.69 |
| 2002/0180590 | A1 | 12/2002 | Abrams |
| 2003/0177012 | A1 * | 9/2003 | Drennan ..................... 704/275 |

* cited by examiner

*Primary Examiner*—Leo Picard
*Assistant Examiner*—Douglas S. Lee
(74) *Attorney, Agent, or Firm*—Vincent K. Gustafson; Intellectual Property/Technology Law (57) ABSTRACT

An audible interactive and programmable heating and cooling digital thermostat providing voice setup instructions for easy and precise temperature management during four different time periods in a twenty-four hour day and the option of distinct weekday and weekend programming temperature setpoints. The audible interactive thermostat includes an alerting means including a visual display device and/or a verbal announcing device to alert a user of current status of programmable time and temperature parameters, to alert a user of different choices within the time and temperature parameters and/or to alert a user of chosen parameters selected from the group including: current status of selectable functions, ambient conditions, programming status and/or response to activation of a triggering means.

26 Claims, 8 Drawing Sheets

DEVICE AND METHOD FOR INTERACTIVE PROGRAMMING OF A THERMOSTAT

BACKGROUND OF INVENTION

1. Field of the Invention

The present invention relates to a device and method for interactive programming of a thermostat, and more particularly, to a universally adaptable thermostat that verbally provides step by step instructions for the operating and/or programming of a programmable or non-programmable thermostat to manage temperature and time parameters in a heating and cooling system.

2. Description of the Related Art

There are several programmable thermostats now available in the market. To operate these thermostats, a user may select a plurality of times within a day and assign a desired temperature to each time. The thermostat then controls a heating and/or cooling system according to the programmed times and temperatures. Programmable thermostats of the type described above are advantageous in that they permit the thermostat to control the heating and/or cooling operation within an environment that changes over the day in accordance with the user's particular schedule, thus saving energy costs.

However, programming such thermostats can be challenging when used by people, who are not very familiar with electronic appliances and with programming procedures/systems. The displays used are usually of the "static" type, with icons and segments, and therefore are not interactive with the user; moreover, conventional devices almost always require a large number of keys, each one specialized according to function. To reduce cost some devices may use fewer keys, but a reduced number of keys also introduces confusing key combinations to memorize. Therefore, even though they may not be completely lacking in general knowledge of programming electronic devices, users are often obliged to consult the related instruction booklet (which is not always completely understandable), and the potential of the programming device can almost never be entirely exploited. Also, the blind or visually impaired are totally excluded from using these energy saving devices.

Accordingly, there is a need for a programmable thermostat that is easily installed on any heating and/or air conditioning system and easily programmable by a user, both sighted or visually impaired, having no knowledge or experience in programming.

SUMMARY OF THE INVENTION

According to one aspect the present invention relates to a programmable thermostat device communicatively connected to a heating/cooling system, the device comprising:
  a microprocessor configured to send signals to and receive signals from the heating/cooling system upon a preset triggering event and/or commands by a user;
  a user interface comprising at least one triggering means that upon activation interacts with the microprocessor;
  a voice storage means comprising pre-recorded audible signals or microprocessor generated audible signals associated with activation of triggering means, wherein the audible signals are responsively actuatable in the microprocessor;
  an announcing means, wherein upon activation of a triggering means, the microcontroller causes an audible signal to be announced relative to the triggering means;
  a display device for displaying output comprising at least one display parameter selected from the group including: current status of selectable functions, ambient conditions, programming status and/or response to activation of a triggering means.

In another embodiment, the present invention relates to a programmable thermostat device communicatively connected to a heating/cooling system adapted for visually impaired users, the device comprising:
  a microprocessor configured to send signals to and receive signals from the heating/cooling system upon a preset triggering event and/or commands by a user;
  a user interface comprising at least one triggering means that upon activation interacts with the microprocessor;
  a voice storage means comprising pre-recorded audible signals or microprocessor generated audible signals associated with activation of triggering means, wherein the audible signals are responsively actuatable in the microprocessor;
  an announcing means, wherein upon activation of a triggering means, the microcontroller causes an audible signal to be announced relative to the triggering means; and
  an alerting means comprising a visual display device and/or a verbal announcing device to alert a user of current status of programmable time and temperature parameters, to alert a user of different choices within the time and temperature parameters and/or to alert a user of chosen parameters selected from the group including: current status of selectable functions, ambient conditions, programming status and/or response to activation of a triggering means.

In yet another aspect, the present invention provides for a method for changing current programmed temperature/time parameters in a thermostat, comprising:
  activating a first triggering means to initiate programming of desired programmed temperature/time parameters;
  responding to a pre-recorded or microprocessor generated audible message offering the option of audible instructions for programming guidance by activating a second triggering means to accept or reject the option of audible instructions;
  activating a third triggering means to input desired programmed temperature/time parameters wherein modified parameters are visually displayed and/or verbally announced; and
  activating a final triggering means to complete programming of desired programmed temperature/time parameters.

In yet another aspect, the present invention provides for a method of changing current ambient temperature parameters in a thermostat, comprising:
  activating a first triggering means to initiate programming of desired ambient temperature parameters;
  responding to a prerecorded audible message offering the option of audible instructions for programming the thermostat by activating a second triggering means thereby initiating audible instructions for programming;
  activating a third triggering means according to audible instructions to input desired ambient temperature parameters wherein modified ambient temperature parameters are visually displayed and/or verbally announced; and
  activating a final triggering means to complete programming of desired ambient parameters.

DETAILED DESCRIPTION OF THE INVENTION, AND PREFERRED EMBODIMENTS THEREOF

Figure 1:
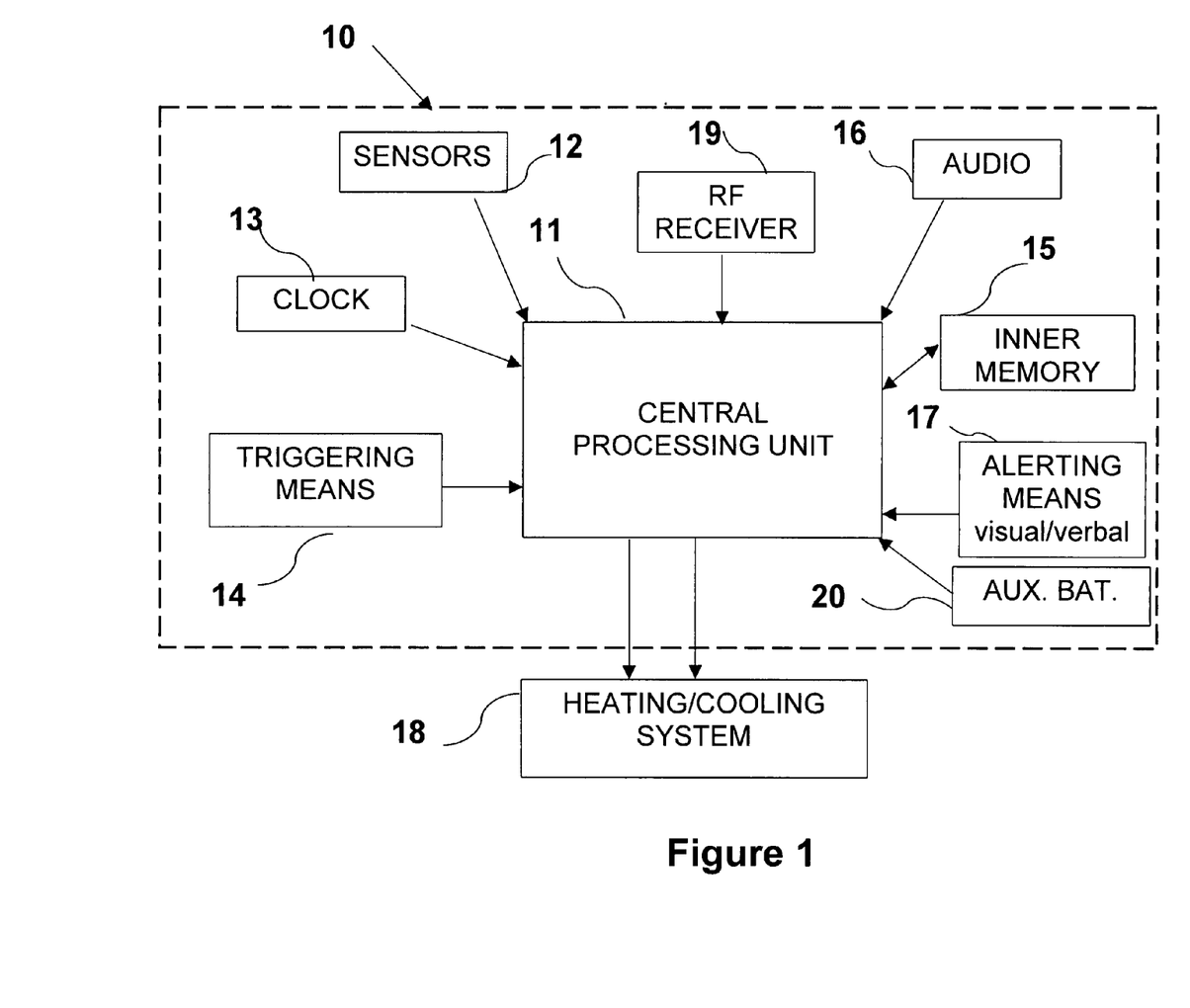
FIG. 1 is a block diagram showing the interconnection of the different components of an audible interactive thermostat according to the present invention.

With reference to FIG. 1, an audible interactive and programmable thermostat of the present invention is indicated by reference number 10, wherein the programmable thermostat is a battery or system powered heating and cooling digital thermostat control device with a microprocessor that plays voice setup instructions and messages for easy and precise temperature management not only during the week but also provides for specific timing instruction for weekends. The thermostat of the present invention is schematically illustrated in FIG. 1 and comprises a central processing unit 11 connected to inner memory 15 wherein preset programs of the thermostat are stored and memorized for activation by user. The processing unit is further communicatively connected to sensors 12 to receive input signals from the sensors to detect ambient temperature in the surrounding area of the thermostat so that the processing unit can send out signals to the heating/cooling system to regulate temperature conditions according to the temperature setpoint programmed into the memory of the processing unit. The processing unit is communicatively connected to a clock 13. Further, the processing unit is able to receive and processes commands inputted by the user through the triggering means 14 that are stored in a non-volatile memory for further activation of the heating/cooling system 18. Alerting means 17, which can be a visual display panel and/or a verbal announcing means, in the illustrated embodiment is display panel that visually displays many features of the present invention including, but not limited to, the current status of heating/cooling system, ambient temperature of the area, mode of programming currently being executed by the central processing unit and/or time and day of the week. Further included in thermostat 10 is an audio system 16 that provides for audio instruction during the programming of the thermostat and can also notify the user of time and ambient temperatures that may be sensed in the heating/cooling system.

In another embodiment, the present invention provides for a unitary structure that comprises the components set forth above and may further include an alerting device that includes a verbal announcing device that may be separate or combined with the audio device 16 to provide alerting announcements and voice instructions for a visually impaired user. The present invention may include both a display device and the verbal announcing device thereby providing a programmable for hearing impaired or visually impaired users.

Figure 2:
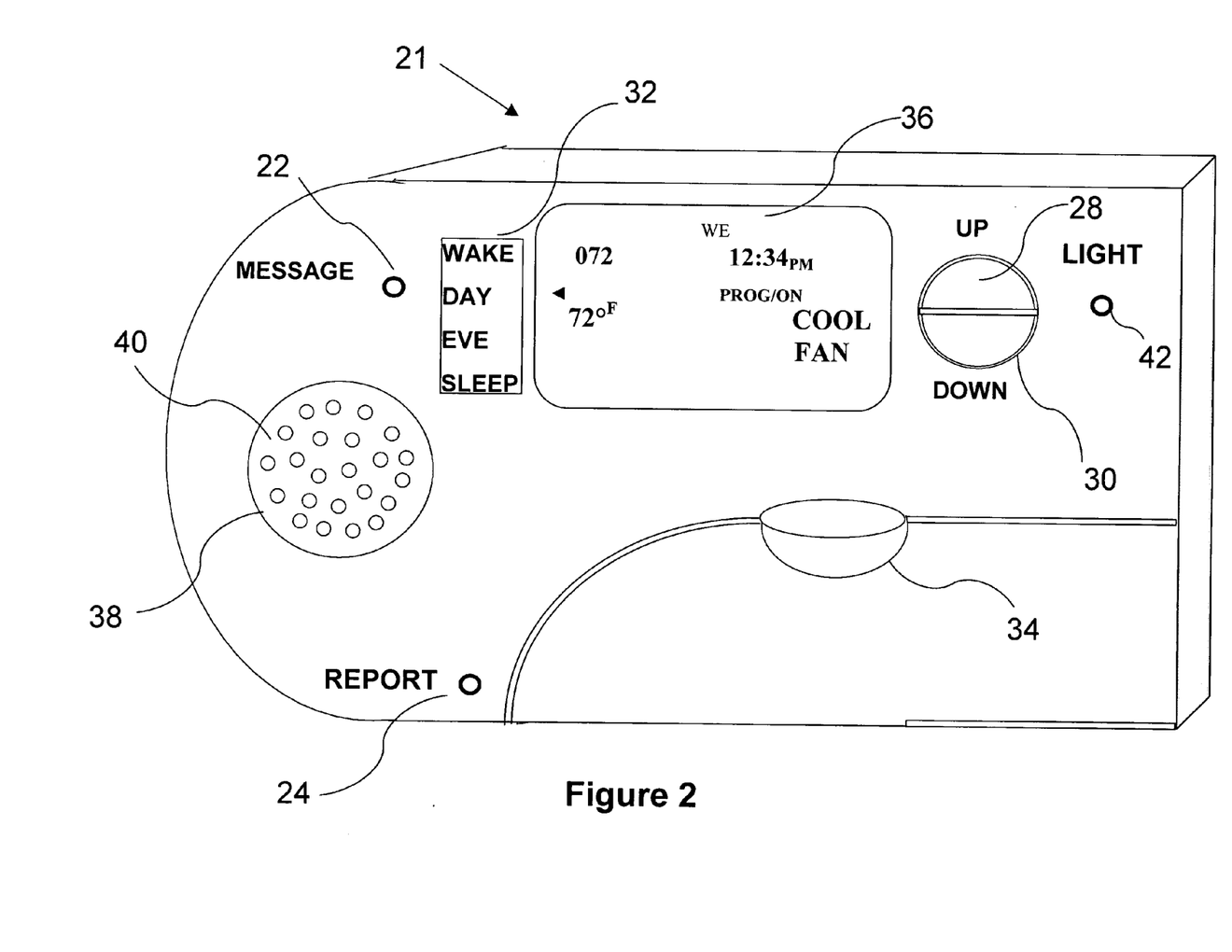
FIG. 2 shows a front view of the thermostat housing for one embodiment of the present invention.

FIG. 2 shows a preferred thermostat housing 21, as a unitary structure according to the present invention comprising a front panel 20 of the present audible thermostat. The front panel includes a plurality of trigger means 14 (see FIG. 1) that upon activation provide for programming the thermostat. The trigger means may include a "REPORT" button 24, which upon activation the current indoor temperature and setpoint temperature are announced and/or visually shown on the display panel 36. Additional messages can be displayed and/or announced, for example, reporting a low battery or a reminder for checking the filter in the heating/cooling system. Further shown on the front panel are "UP" and "DOWN," buttons, 28 and 30 respectively, which upon activation can adjust any number setting up or down, such as adjusting temperatures and/or setting the clock. As these buttons are activated, the resulting activation can be verbally announced. It should be noted that all triggering means, such as the buttons and switches shown in FIGS. 2 and 3 can be fabricated of a material that provides an acceptable surface and size for imprinting brail letters thereon.

Still further shown on the front panel are additional features that simplify the programming of the thermostat relating to the programming of temperature setpoints and providing an indication as to which particular temperature setpoint program is currently active. For instance, a 24 hour period may be divided into four separate time periods 32, including "WAKE", "DAY", "EVE" and "SLEEP" and each time period can include preferred heating/cooling temperatures that are applied during a 24 hour period.

The digital display panel 36 provides a visual display of programming parameters and current status of the heating/cooling system. Preferably, a liquid crystal display (LCD) which when an electrical connection is made, circuitry that is well known in the art, causes the LCD to emit a signal responding to the button activated. The display panel may also include the respective days of the week, including "MO," "TU," "WE," "TH," "FR," "SA" and "SU". As shown on the display panel 36 the illustrated day of the week is Wednesday "WE." In the visually impaired embodiment, all the displayed icons will also be associated with voice tags to alert the user of the day and time. The digital display panel further displays the indoor temperature and the temperature set point on the LCD display. The larger lower number is the indoor temperature and the smaller number (above) is the current setpoint. A user can check the indoor and setpoint temperatures by pressing the "REPORT" button 24 and the following message may be played:

"The indoor temperature is (______) degrees."

"The thermostat is set for (______) degrees."

The digital display panel further provides visual and/or verbal (if the verbal announcement device has been included and/or activated) indication of the time of day and the specific time period, that being, in the "AM" or "PM" time period. There is also included a visual display and/or an announcement that alerts the user as to whether the programming system is currently in the "ON" or "OFF" position and in which mode the system is currently running, that being "HEAT," "COOL" and/or "FAN." The digital display panel provides for alerting the homeowner or user regarding specific conditions that require attention, for example, a message can be displayed that warns the batteries are low in the thermostat or that the system has been running a predetermined length of time and the air filter may need to be inspected for changing or cleaning.

In another embodiment, the present invention may further comprises additional programming that provides voice tags for each of the different trigger means thereby providing an audible announcing system to audibly informed visually impaired user of any changes in the system, audibly instruct the user before each trigger step and audibly confirm completion of each command. Thus, this embodiment generates control signals in conjunction with audio signals thereby alerting user of current condition, choices for altering and programming the heat/cool system.

The front panel further includes, to accommodate the audio features of the present invention, an audio system comprising a speaker 38 mounted within the thermostat housing. A grid 40 in the thermostat housing protects the speaker, while providing substantial free space for sound to travel through the grid 40. The speaker, having an adjustable volume, is preferably mounted so that it will project sound away from the thermostat housing into the area of the room. An amplifier drives the speaker as well known in the art. Pressing any of the trigger means initiates the applicable audio message through the speaker representative of the action of selected triggering means.

The audio system further comprises a voice chip to enunciate the desired action, current status of system or provide instructions of programming. An addressable voice chip is preferred so that the person assembling the device is able to record the necessary audible messages. The end user is then able, using the triggering means to output the messages applicable to selected triggering means. Verbal announcements can be stored in a conventional serial or parallel memory chips, or directly in the microprocessor. Alternatively, the microprocessor includes applicable algorithms that generate voice-like words in response to specific requests. Any commercially available voice chip or addressable voice chip that provides the above features may be used. Further, the audio system may comprise a microphone for recording capability coupled to the addressable voice circuit to allow the user to provide a message for later playback.

Figure 3:
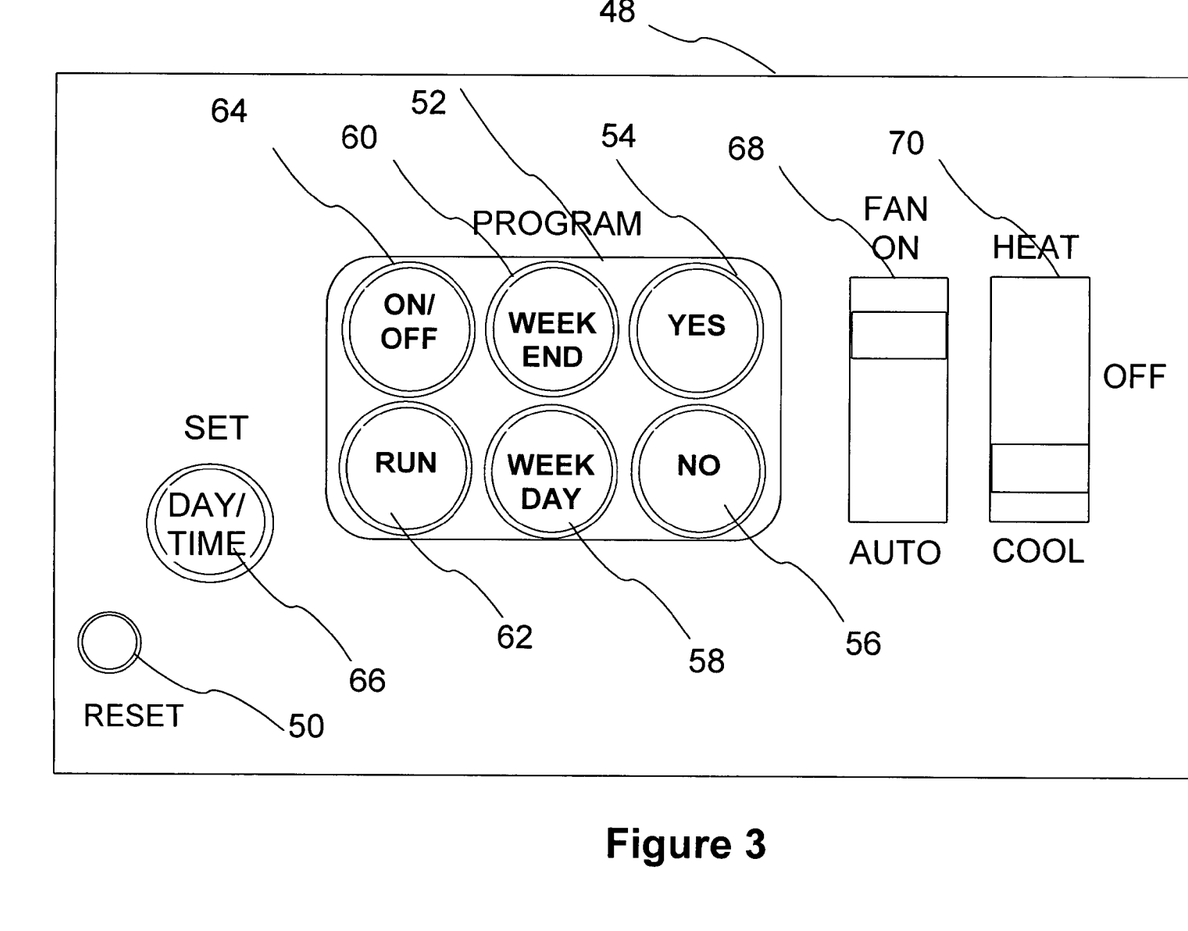
FIG. 3 shows a front view of the internal panel of the thermostat housing of FIG. 2.

The front panel further includes a front panel door 34, which springs open to show an interior panel 48, as shown in FIG. 3, which provides additional triggering means for programming of the thermostat. Reset button 50, resets the thermostat to the factory default program settings. For example, if any of the functions on the display panel 36 lock up or the display panel scrambles, the user can open the thermostat housing and then press "RESET" to restore default settings.

The "PROGRAM" panel 52 includes multiple buttons required for programming the thermostat. Specifically, the "ON/OFF" button 64 turns programming on and off; the "RUN" button 62 saves any changes made during the programming or when "OVERIDE" is displayed, turns it off and restores the originally programmed settings; the "WEEKEND" button 60 programs Saturday and Sunday time and temperature setpoints; "WEEKDAY" button 58 programs Monday through Friday time and temperature setpoints; the "YES" button 54 confirms requests and the "NO" button 56 cancels requests.

The "SET" button 66 adjusts the day and time settings. For example, the user presses the "DAY/TIME" button 66, and the user will hear the audible announcement:

"Do you want to change the Day or Time Settings? Press YES or NO,"

and the user activates either button 54 and 56, indicating "YES" or "NO" respectively. If the NO button is pressed, the day and time settings remain the same. If the "YES" button is activated, the user will likely hear:

"Would you like voice instructions? Press the YES or NO button."

If the "YES" button is pressed by the user, each programmed step will be announce to the user for providing guidance through the programming instruction. The thermostat of the present invention will wait for each step to be completed before proceeding to the next voice instruction. If the "NO" button is pressed, programming can be done without voice assistance and guidance is displayed on the display panel 36 (FIG. 2). For example, the time will be displayed on the digital display panel 36, and if no change is required the "RUN" button 62 is pressed.

In the alternative to make changes to the time, the "UP" or "DOWN" buttons, 28 and 30 respectively, are pressed to set the hours and minutes. When the desired time is reached, the "RUN" button is activated. Next the DAY will be displayed on the display panel 36, and if no change is required the user presses the "RUN" button. In the alternative if the day is changed, the "UP" and "DOWN" buttons are pressed until the desired day is shown on the display panel and then the user presses the "RUN" button. In the visually impaired embodiment, the user will hear each minute as the clock is set, then each hour, and finally each day of the week until the desired hour, minute or day is reached.

The internal panel 48 further comprises several additional trigger means that activate different modes of the heating/cooling system. For example, switch 68 can be moved to set the fan, connected to the heating/cooling system, to run continuously or switched to run only when the heating or cooling is operating. Switch 70 is moved to turn the heating/cooling system "OFF" or moving the switch into the "HEAT" position can activate the heating system. In the alternative, moving the switch into the "COOL" system can activate the cooling system.

When the user desires to program the thermostat of the present invention, the user opens the front panel door to show the internal panel 48 and activates the "ON/OFF" button 64 in the "PROGRAM" panel 52. The digital display panel 36 will show PROG/ON and the following audio announcement will be heard:

"Program is ON"

When the PROG/ON is displayed and the user does not change the "WEEKEND" and "WEEKDAY" time and temperature setpoints, the thermostat of the present invention will "run automatically." Run automatically means that the last entered program settings will be used. If the present thermostat has never been programmed, the factory default settings will automatically be used. Preferably the default settings are comparable to the EPA Energy Star Acceptable Setpoint Time and Temperature settings, such as shown below:

| TIME | HEAT | COOL |
| --- | --- | --- |
| Wake Up Time: 6 AM | 70° F. | 78° F. |
|  | 21° C. | 26° C. |
| Day Time: 8 AM | 62° F. | 85° F. |
|  | 17° C. | 29° C. |

-continued

| TIME | HEAT | COOL |
|---|---|---|
| Evening Time: 6 PM | 70° F. | 78° F. |
| | 21° C. | 26° C. |
| Sleep Time: 10 PM | 62° F. | 82° F. |
| | 17° C. | 28° C. |

If the user decides to change the factory default settings (or any previous settings), programming can be efficiency completed by initially jotting down the desired weekday and weekend settings for easy reference during the programming. For example, an applicable table is shown below:

| | Time | Heat ° F./C. | Cool ° F./C. |
|---|---|---|---|
| WEEKDAY | | | |
| Wake Up | | | |
| Day | | | |
| Evening | | | |
| Sleep | | | |
| WEEKEND | | | |
| Wake Up | | | |
| Day | | | |
| Evening | | | |
| Sleep | | | |

Initially, the mode of heating or cooling has to be inputted by moving switch 70 to HEAT to change the heat program or move the system switch to COOL to change the cool program. The system will remind the user, either visually or verbally, to turn the system to HEAT or COOL. If the switch is in the OFF position, OFF will be digitally displayed and/or audibly announced and the user will be unable to program the thermostat.

After the mode, heating or cooling, is selected, the "WEEKDAY" or "WEEKEND" button, 58 or 60 respectively, is activated. When the "WEEKDAY" button is activated, the user will hear a message such as the following:

"Do you want to change the program? Press YES or NO."

If the "NO" button is pressed, the thermostat stays in the present status. If the user activates the "YES" button, the following message will be heard:

"Would you like voice instructions? Press YES or NO."

It should be noted that the programming can be completed without voice assistance, if the "NO" button is pressed. If the "YES" button is pressed, each programming step will be announced to the user. The audible interactive thermostat of the present invention will wait for the user to confirm each step by pressing the "RUN" button before proceeding with the next step. When all the steps have been completed the user will hear:

"Program complete"

The programming will initiate with Wake Up Time Programming. The system will announce the following message:

"Press the UP or DOWN key to set the Wake Time, when finished, press RUN"

If no change is required the user presses the "RUN" button. To make changes, the user presses the "UP" or "DOWN" button to set the Wake Up Time. In the visually impaired embodiment the time is announce every time the "UP" or "DOWN" button is pressed. When the desired Time is chosen, the user presses the "RUN" button. The Wake Up Temperature is changed the same as the Wake Up Time. The Day Time, Evening Time and Sleep Time programming is programmed in a similar fashion until the programming is complete.

Other options of the present invention include choosing between using Fahrenheit and Celsius by pressing the "YES" and "NO" buttons together for about 3 seconds to switch the LCD display between Fahrenheit and Celsius.

Additionally, when the thermostat is in the programming mode, the temperature setpoints can be manually overridden by pressing "UP" or "DOWN" buttons to the desired temperature. "OVERRIDE" is displayed and the thermostat will remain in the manual temperature setpoint until either 1) the next program time change or 2) the "RUN" button is pressed.

The "RUN" button stores any program changes when pressed while the "PROG/ON" is displayed. If the "RUN" button is pressed while the "OVERRIDE" is displayed on the digital display panel 36, the setpoint temperature returns to the programmed setting, which will be either the factory default settings or the latest programmed setting.

The thermostat further provides for a warning when the batteries are starting to run low. The digital display screen 36 will display "LO BAT" for approximately three (3) weeks before the batteries become dead. If the batteries become too low, the screen will go blank. A verbal "LOW BATTERY" message is appended to the "REPORT" message when the batteries are low. After pressing the "REPORT" button and hearing the "low battery" message, the "LOW BATTERY" icon on the display screen is removed.

A remote control device can further program the thermostat, so that a user can override the thermostat without physically contacting the thermostat housing. Any universal remote that emits a command signal, which is modulated (either frequency modulated or amplitude modulated) to be representative of the button that is pressed, may be used with the present invention, such as the remote device described in U.S. Pat. No. 6,130,624, the contents hereby incorporated herein by reference for all purposes. The command signal is transmitted to the thermostat housing and received by a RF receiver 19 (FIG. 1) to effectuate the function of the activated button.

In a further embodiment, the thermostat can be also directly connected to a telephone line and programmed remotely through telephone transmission lines, using either voice frequency signal or frequency signals different from voice frequencies.

Figure 4:
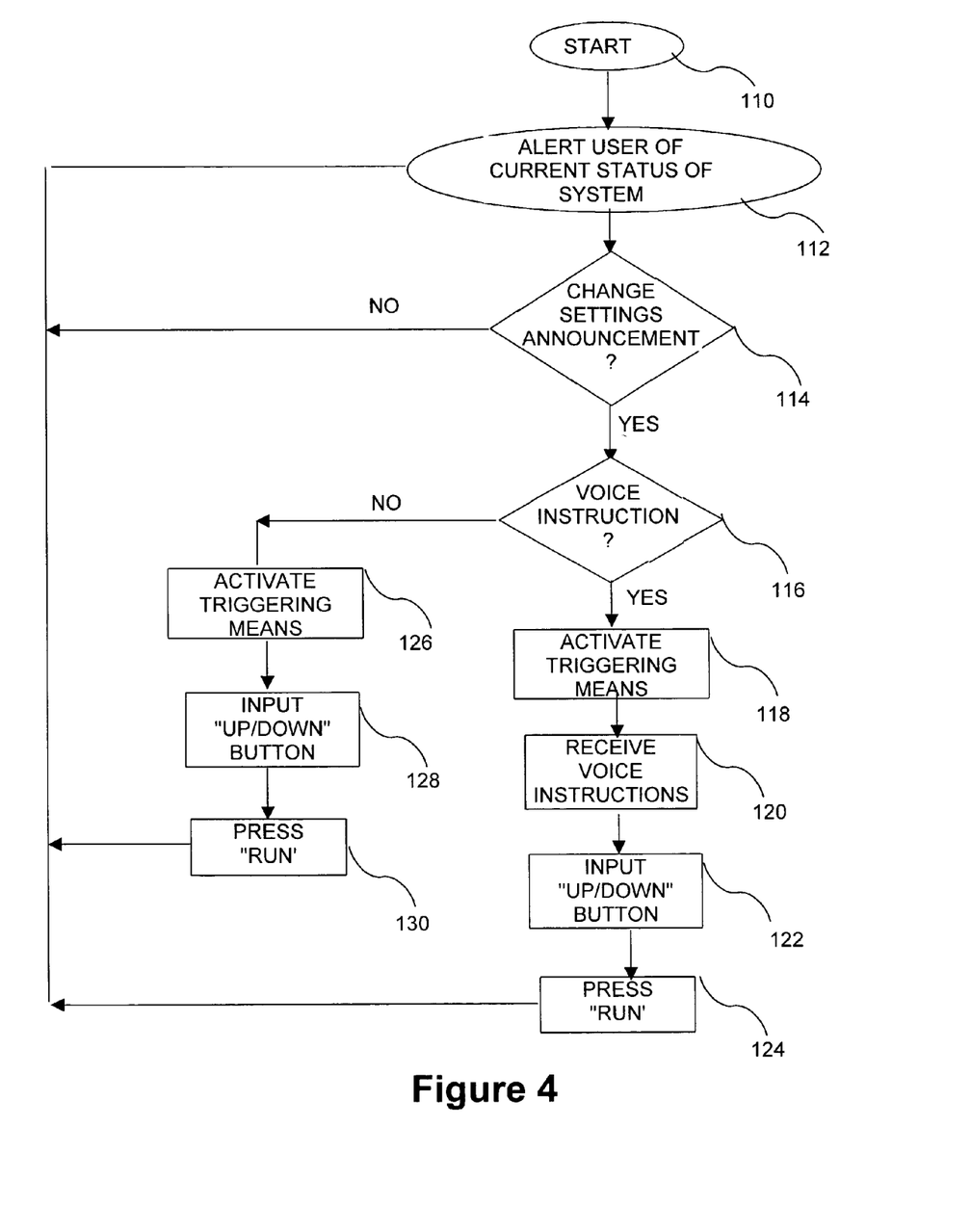
FIG. 4 is a flow chart illustrating a procedure for programming of the thermostat according to the present invention.

FIG. 4 illustrates a representative software routine incorporated into the computer system for the purpose of effectuating a task of programming, which is displayed in a simplified top-level block diagram. The time and temperature programming starts 110 by activating the PROG/ON button which proceeds to initialize various memories of the system. The program then proceeds to step 112 at which point the display panel 36 displays the current status of the system including information on the temperature, time, day of the week, current program settings. Alternatively, the system verbally announces the current status of the system. The program may proceed to request if the user wishes to change settings of the program 114. If the user selects "NO" by activating the "NO" button 56, then the previous settings remain the same. If the user selects "YES", the program retrieves a messages requesting if the user wants voice instructions during the programming process 116. If the user selects "YES", the program awaits until the user selects and activates a specific trigger means 118 and the processing unit retrieves applicable instruction from memory to provide voice instructions to the user 120. Upon inputting selected parameters by the user pressing the "UP" and "DOWN" buttons 122, the processing unit stores the input in memory, sets the new settings for the chosen parameters, optionally announces the new settings, and waits for the user to complete the programming process by triggering the "RUN" button 124 to complete the process. The new parameter is then stored and/or displayed 112 on the display screen 36 and/or verbally announced. If the user decided not to use the voice instructions by pressing "NO", the user selects a specific triggering means 126, and inputs setting parameters by pressing the "UP/DOWN" keys 128 until the desired settings is reached. Upon completion the user selects the "RUN" button to complete the process 130.

The present invention provides for several unique and advantageous programming features including, four separate time and temperature settings, 5/2 weekday/weekend programming, a 7 day individual programming feature, an override temperature feature which allows manual change of the temperature setpoint until the next program time or until the "RUN" button is pressed, holds both heating and cooling programs simultaneously, provides a button that announces a personalized message 22 (see FIG. 1), a LCD display panel that displays both ambient temperatures and current setpoint temperatures, an announcing means that corresponds or replaces the visual display panel to provide the user with verbal current status and all updates in the system and providing for cycle adjustments in three different temperature spans.

Additionally, the present audible interactive thermostat will trigger the system "ON" or "OFF" to cycle through a set program only when the indoor temperature is above or below the temperature setpoint, whether the temperature setpoint is the factory default setting or specifically programmed by the user. The Cycle rate of the present thermostat can be adjusted by pressing the "UP" and "DOWN" button at the same time for approximately 5 seconds to force the temperature display on display panel 36 to flash and then C1, C2 or C3 will be displayed. To select the desired cycle rate the user presses the "UP" or "DOWN" button. The cycle rate settings include: Cycle 1 for minimum temperature range and efficiency, Cycle 2 to provide normal temperature range and efficiency and Cycle 3 for maximum range and efficiency. The "RUN" button is pressed to accept the new cycle settings. The temperature display range of the present thermostat is from about 40° to about 99° F. and the control range is from about 40° to about 99° F.

Figure 5A:
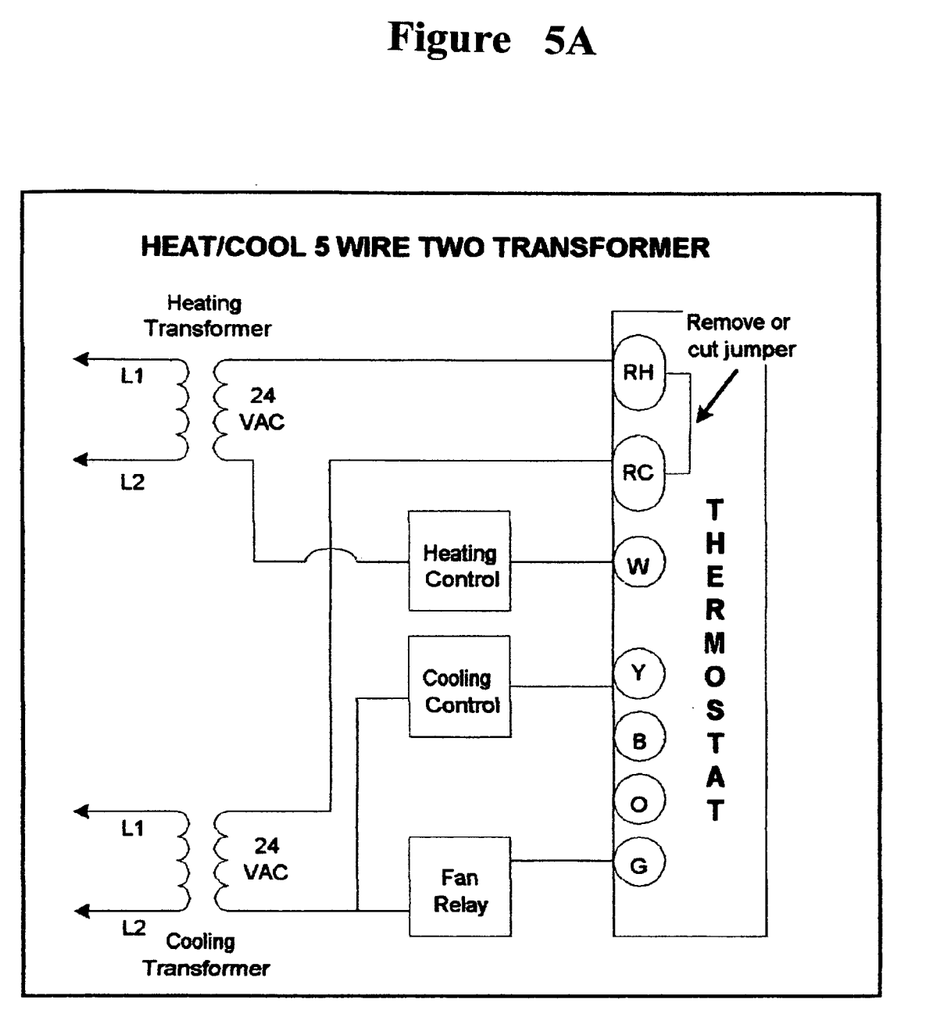
FIG. 5 shows different wiring diagrams for single and double transformer heating/cooling systems.
Figure 5B:
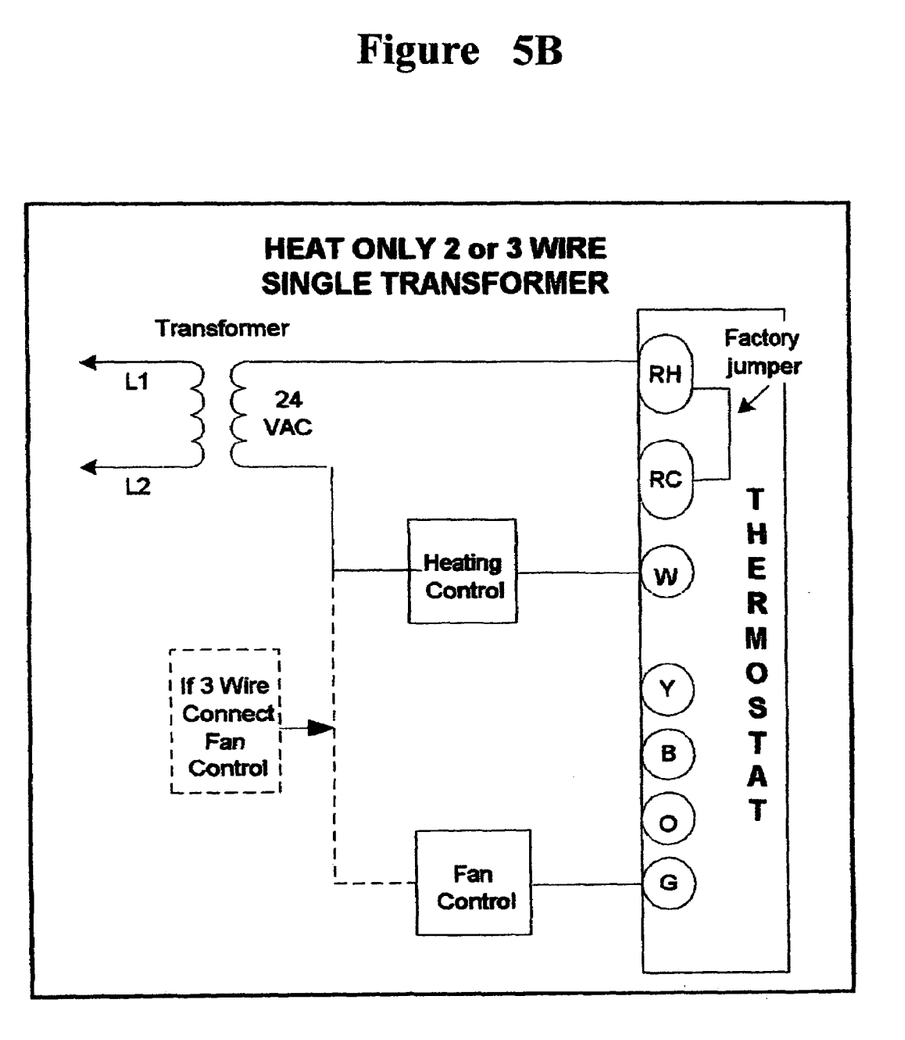
Figure 5C:
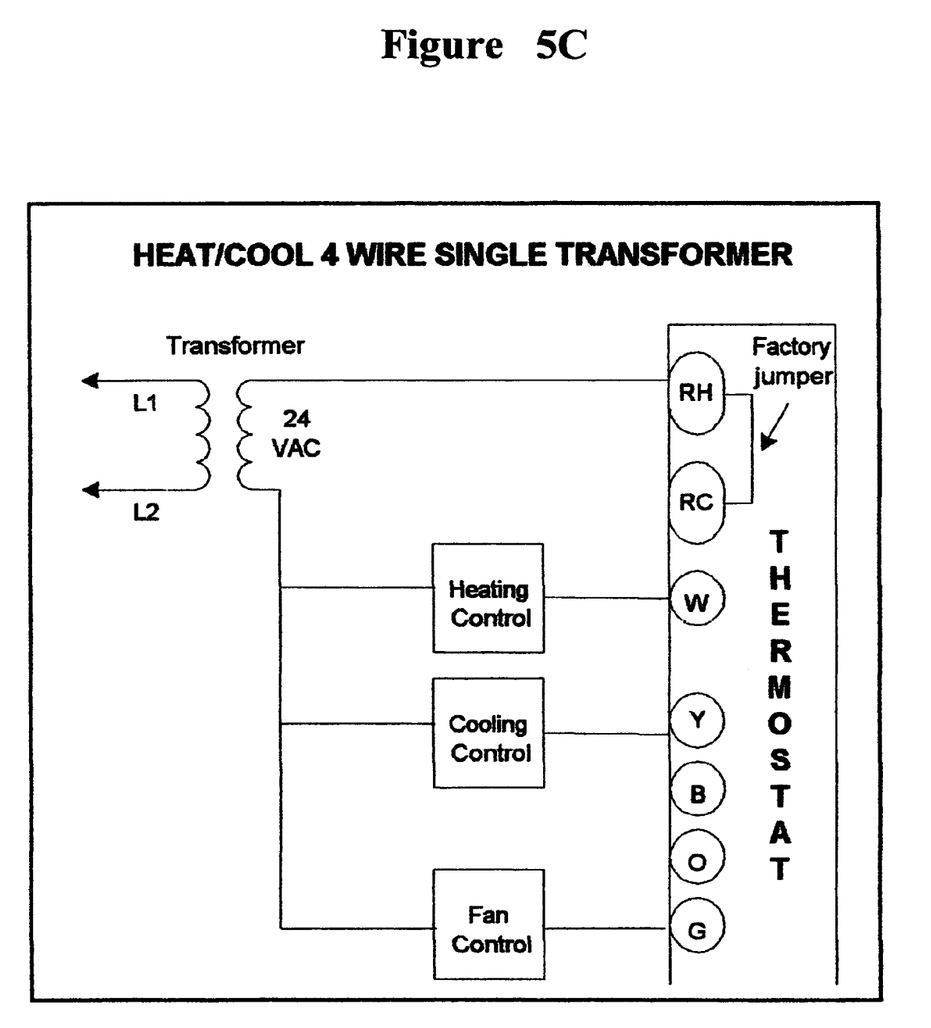
Figure 5D:
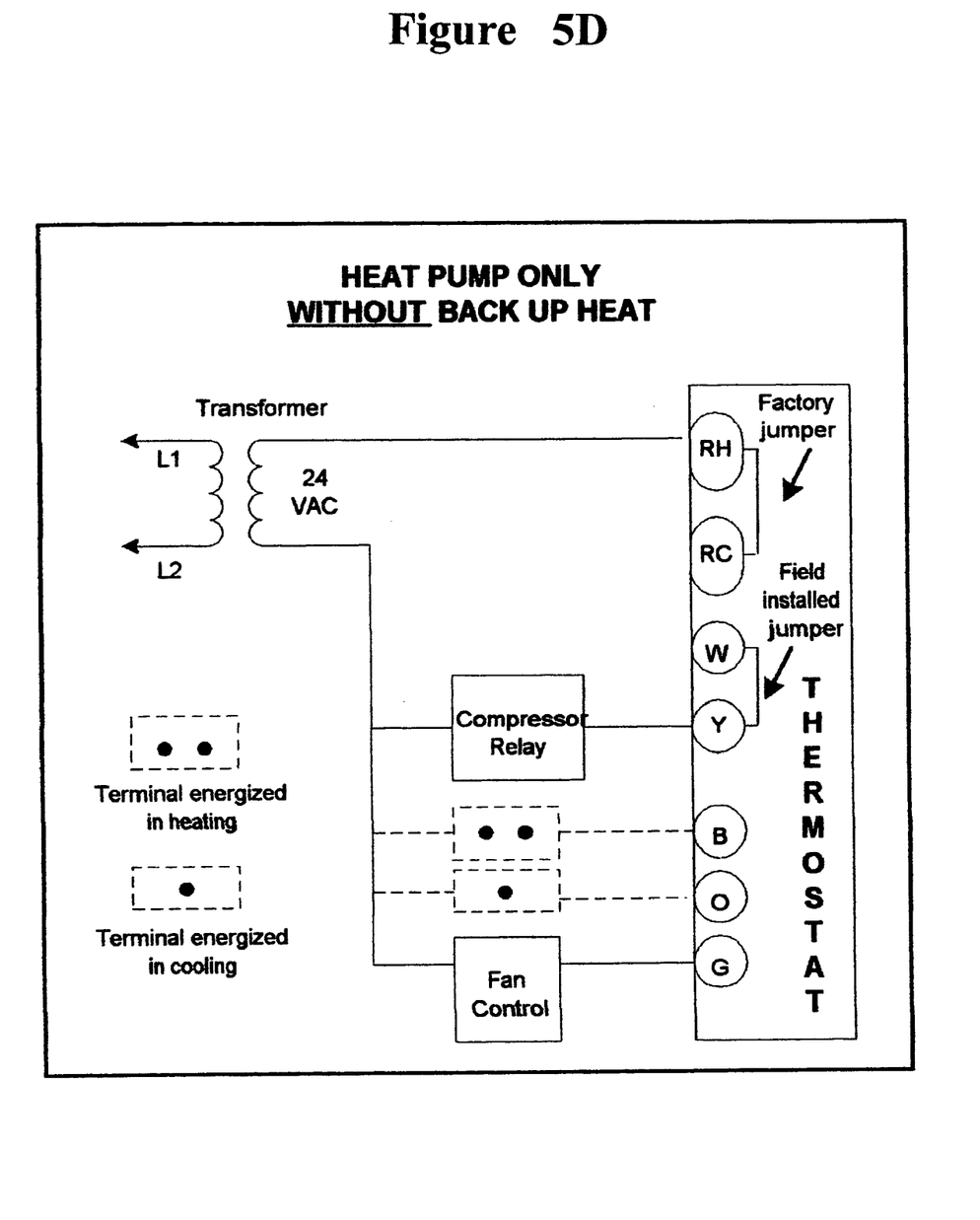

Advantageously, the present thermostat has the ability to be connected to most heating/cooling system and includes multiple terminals, in a range of from 4 to about 10 terminals, for providing adaptation to single or two-transformer systems thereby allowing for connection to several different types of heating/cooling systems, including but not limited to Heat/Cool units with a 5 wire two transformer, Heat only units with a 2 or 3 wire single transformer, Heat/Cool units with a 4 wire single transformer and heat pumps, as shown in FIGS. 5A, B, C and D.

Although the present invention has been described with reference to preferred embodiments, one skilled in the art will recognize that changes may be made in form and detail without departing from the spirit and scope of the invention. For instance, workers skilled in the art will appreciate that all of the various embodiments discussed herein may be employed with one or more of the other embodiments.

What is claimed is:

1. A programmable thermostat device communicatively connected to a heating/cooling system, the device comprising:
   a microprocessor configured to activate the heating/cooling system upon a preprogrammed triggering event or programming commands by a user;
   a user interface comprising at least one user-activatable triggering element adapted to interact with the microprocessor;
   a verbal signal storage element comprising any of prerecorded and microprocessor-generated verbal signals associated with activation of the triggering element;
   an announcing element, wherein upon activation of the at least one triggering element, the microprocessor causes the announcing element to provide a verbal signal to announce any of; control functions; current status of selectable functions, mode of programming being executed, current status of programmable time, programming status, instructions for programming the device, and confirmation of completion of a programming command.

2. The device according to claim 1, wherein the verbal signal can be selectively actuatable.

3. The device according to claim 1, further comprising a RF receiver communicatively connected to the microprocessor, the RF receiver being adapted to receive signals transmitted from a remote device.

4. The device according to claim 1, wherein the programming commands are stored in any of the microprocessor and a memory device communicatively connected to the microprocessor.

5. The device according to claim 4, wherein the programming commands comprise separate temperatures and times for any of individual days of the week and weekends.

6. The device according to claim 4, wherein the programming commands comprise a plurality of separate time and temperature settings.

7. The device according to claim 5, wherein a triggering element is designated for programming time and temperature for weekdays.

8. The device according to claim 7, wherein a triggering element is designated for programming time and temperature for weekends.

9. The device according to claim 1, further comprising a triggering element that upon activation causes the announcing element to announce any of current ambient temperature and programmed settings.

10. A programmable thermostat device communicatively connected to a heating/cooling system and adapted for visually impaired users, the device comprising:
    a microprocessor configured to activate the heating/cooling system upon any of a preset triggering event and programming commands by a user;
    a user interface comprising at least one user-activatable triggering element adapted to interact with the microprocessor;
    a verbal signal storage element comprising any of prerecorded audible signals and microprocessor-generated audible signals associated with activation of the triggering element;
    an announcing element, wherein upon activation of the at least one triggering means, the microprocessor causes the announcing element to provide a verbal signal to announce any item of: current status of programmable time, mode of programming being executed, current status of selectable functions, programming status, instructions for programming the device, and confirmation of completion of a programming command.

11. The device according to claim 10, further comprising a visual display device adapted to display at least one visual signal.

12. A method of changing current programmed time-dependent temperature parameters in a thermostat, the method comprising the steps of:
   activating a first triggering element to initiate programming of desired programmed time-dependent temperature parameters;
   responding to a pre-recorded or microprocessor-generated verbal message offering verbal instructions for programming time-dependent temperature parameters the thermostat by activating any of the first triggering element and a second triggering element to accept or reject the offer of verbal programming instructions;
   activating any of the first, the second, and a third triggering element to complete programming of desired programmed time-dependent temperature parameters.

13. The device according to claim 1, wherein programmed temperature can be overridden by a triggering element that upon activation manually changes the programmed temperature to a desired temperature.

14. The device according to claim 13, wherein the desired temperature remains until a stored programming command is activated by the microprocessor.

15. The device according to claim 1, wherein the verbal signal storage element comprises pre-recorded voice signals.

16. The device according to claim 1, wherein the announcing element comprises a speaker.

17. The device according to claim 1, wherein the microprocessor causes the announcing element to provide a verbal signal to announce instructions for programming the device.

18. The device according to claim 1, wherein the verbal signal storage element comprises any of a memory, a voice chip, and an addressable voice chip.

19. The device according to claim 1, adapted to provide a verbal signal indicative of any of a low battery warning and a reminder to check a filter in the heating/cooling system.

20. The device according to claim 1, wherein a triggering element is designated for programming time and temperature for each individual day of the week.

21. The device according to claim 1, wherein the at least one triggering element comprises at least one button.

22. The device according to claim 10, wherein the microprocessor causes the announcing element to provide a verbal signal to announce instructions for programming the device.

23. The device according to claim 10, wherein the programming commands comprise time-dependent temperature settings.

24. The device according to claim 23, wherein the time-dependent temperature settings comprise any of time-dependent temperature settings for individual days of the week, time-dependent temperature settings for weekdays, and time-dependent temperature settings for weekends.

25. The method according to claim 12, further comprising the step of providing a remote device adapted to communicate with a RF receiver communicatively connected to the microprocessor, wherein the remote device includes any of the first, second, and third triggering element, and the triggering activating step includes transmitting a signal from the remote device to the RF receiver.

26. The method according to claim 12, wherein each of the activating and responding steps are performed with the first triggering element.

* * * * *

UNITED STATES PATENT AND TRADEMARK OFFICE
CERTIFICATE OF CORRECTION

| | | |
|---|---|---|
| PATENT NO. | : 7,146,253 B2 | Page 1 of 1 |
| APPLICATION NO. | : 10/395587 | |
| DATED | : December 5, 2006 | |
| INVENTOR(S) | : Klaus D. Hoog et al. | |

It is certified that error appears in the above-identified patent and that said Letters Patent is hereby corrected as shown below:

In column 10, line 17 (claim 1), "any of; control functions; current status" should be -- any of: control functions, current status --.

Signed and Sealed this

Twenty-seventh Day of March, 2007

JON W. DUDAS
*Director of the United States Patent and Trademark Office*